(12) United States Patent
da Conceicao Rosa et al.

(10) Patent No.: US 10,511,216 B2
(45) Date of Patent: Dec. 17, 2019

(54) SLIDING LINEAR BEARING HAVING A SMALL ANGULAR ERROR

(71) Applicant: ETEL S.A., Motiers (CH)

(72) Inventors: Andre-Rafael da Conceicao Rosa, La Chaux-de-Fonds (CH); Christophe Hulmann, Pontarlier (FR)

(73) Assignee: ETEL S.A., Motiers (CH)

( * ) Notice: Subject to any disclaimer, the term of this patent is extended or adjusted under 35 U.S.C. 154(b) by 338 days.

(21) Appl. No.: 15/446,013

(22) Filed: Mar. 1, 2017

(65) Prior Publication Data
US 2017/0257014 A1  Sep. 7, 2017

(30) Foreign Application Priority Data
Mar. 2, 2016  (EP) .................... 16158165

(51) Int. Cl.
| | | |
|---|---|---|
| H02K 41/03 | (2006.01) | |
| F16C 29/00 | (2006.01) | |
| F16C 29/02 | (2006.01) | |
| H02K 7/08 | (2006.01) | |
| F16C 29/12 | (2006.01) | |
| F16C 41/00 | (2006.01) | |

(52) U.S. Cl.
CPC ......... *H02K 41/031* (2013.01); *F16C 29/002* (2013.01); *F16C 29/02* (2013.01); *F16C 29/12* (2013.01); *H02K 7/08* (2013.01); *F16C 41/004* (2013.01); *F16C 2380/26* (2013.01); *H02K 2213/09* (2013.01)

(58) Field of Classification Search
CPC .... H02K 41/031; H02K 7/08; H02K 2213/09; F16C 29/002; F16C 29/02; F16C 29/12; F16C 29/123; F16C 41/004; F16C 2380/26

USPC .......... 310/12.22, 12.27, 14.04, 12.06, 12.31
See application file for complete search history.

(56) References Cited

U.S. PATENT DOCUMENTS

| | | | | | |
|---|---|---|---|---|---|
| 3,805,552 | A | * | 4/1974 | Heald | ............... F16C 29/02 464/162 |
| 4,630,941 | A | * | 12/1986 | Chainer | ............ F16C 29/025 310/323.01 |
| 5,317,221 | A | * | 5/1994 | Kubo | ............. H02K 41/0356 310/12.16 |

(Continued)

FOREIGN PATENT DOCUMENTS

| | | |
|---|---|---|
| EP | 0816013 B1 | 12/2001 |
| JP | 2001227536 A | 8/2001 |
| WO | WO 9521336 A1 | 8/1995 |

*Primary Examiner* — Mang Tin Bik Lian
*Assistant Examiner* — Ahmed Elnakib
(74) *Attorney, Agent, or Firm* — Leydig, Voit & Mayer, Ltd.

(57) ABSTRACT

A sliding linear bearing includes a guide shaft on which a slider is movably guided in a guide direction. Bushes are inserted between the guide shaft and the slider including a main bush that is fixedly attached to the slider and a preloading bush that is held so as to be rotatable relative to the slider about the guide direction while being preloaded with a torque. The main bush and the preloading bush are preloaded by the torque in opposite directions of rotation without play relative to the guide shaft. A contact region between each of the bushes and the guide shaft blocks rotation about the guide direction between the slider and the guide shaft in both directions of rotation.

14 Claims, 6 Drawing Sheets

(56) References Cited

U.S. PATENT DOCUMENTS

| | | | | |
|---|---|---|---|---|
| 5,600,189 A | * | 2/1997 | Van Geel | H01F 7/17 |
| | | | | 29/739 |
| 5,777,403 A | * | 7/1998 | Yuan | H02K 41/0356 |
| | | | | 310/12.16 |
| 6,071,012 A | * | 6/2000 | Kuhl | B23Q 1/017 |
| | | | | 384/41 |
| 6,408,706 B1 | * | 6/2002 | Nagai | F16C 29/02 |
| | | | | 384/29 |
| 2004/0239192 A1 | * | 12/2004 | Lilie | F04B 35/045 |
| | | | | 310/12.24 |

* cited by examiner

SLIDING LINEAR BEARING HAVING A SMALL ANGULAR ERROR

CROSS-REFERENCE TO PRIOR APPLICATION

Priority is claimed to European Patent Application No. EP 16 158 165.7, filed on Mar. 2, 2016, the entire disclosure of which is hereby incorporated by reference herein.

FIELD

The present invention relates to a sliding linear bearing having a particularly small angular error. Such sliding bearings serve to move a machine part in a linear direction without carrying out any additional movements that would unintentionally alter the positioning of the machine part.

BACKGROUND

In semiconductor fabrication, there is a requirement, in various machines and measuring instruments, to move a wafer along a vertical Z-direction without rotating it about the Z-axis during this movement. This direction of rotation will here be denoted as "rZ." Thus, in an inspection device for quality control, a wafer may be placed in a pre-adjusted position on a stage, which is then moved vertically into the focal range of a microscope. To be able to inspect the regions of interest of the wafer, the orientation of the wafer must be maintained, except for the Z-direction. Rotation in rZ would be particularly disadvantageous because it would have the effect of a large displacement of the searched position in the plane of the wafer in the peripheral regions of the wafer; i.e., far away from the center of rotation. It is therefore desired to have a Z-axis having as small an angular error as possible.

A straight-line mechanism which is adjustable without play is known from EP 0816013 B1. Here, a wedge-profiled element between a guide shaft and a bearing bush allows the play between the guide shaft and the bearing bush to be adjusted by rotating the bearing bush relative to the guide shaft. The bearing bush is attached to the slider by means of oblong holes, so that the play can be readjusted when the shape of the bearing bush has changed due to wear. By providing three wedges around the circumference of the bearing bush and guide shaft, the two elements remain centered relative to each other. Furthermore, it is proposed to tangentially preload the bearing bush by means of a spring, so that a play-free yet easy sliding is possible at all times, even when wear has occurred or under thermal expansion conditions. However, this straight-line mechanism still allows a certain rotation of the slider relative to the guide shaft since the wedge-profiled elements are all oriented in the same direction and have only a small slope angle. Therefore, the bearing bush and slider may rotate about the guide shaft, and especially easily in one of the two directions of rotation because the wedges disengage from one another in this direction, thereby increasing the play of the straight-line mechanism. In order to move a movable part linearly and block its rotation about the linear direction, at least two such straight-line mechanisms are required here.

SUMMARY

In an embodiment, the present invention provides a sliding linear bearing including a guide shaft on which a slider is movably guided in a guide direction. Bushes are inserted between the guide shaft and the slider including a main bush that is fixedly attached to the slider and a preloading bush that is held so as to be rotatable relative to the slider about the guide direction while being preloaded with a torque. The main bush and the preloading bush are preloaded by the torque in opposite directions of rotation without play relative to the guide shaft. A contact region between each of the bushes and the guide shaft blocks rotation about the guide direction between the slider and the guide shaft in both directions of rotation.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
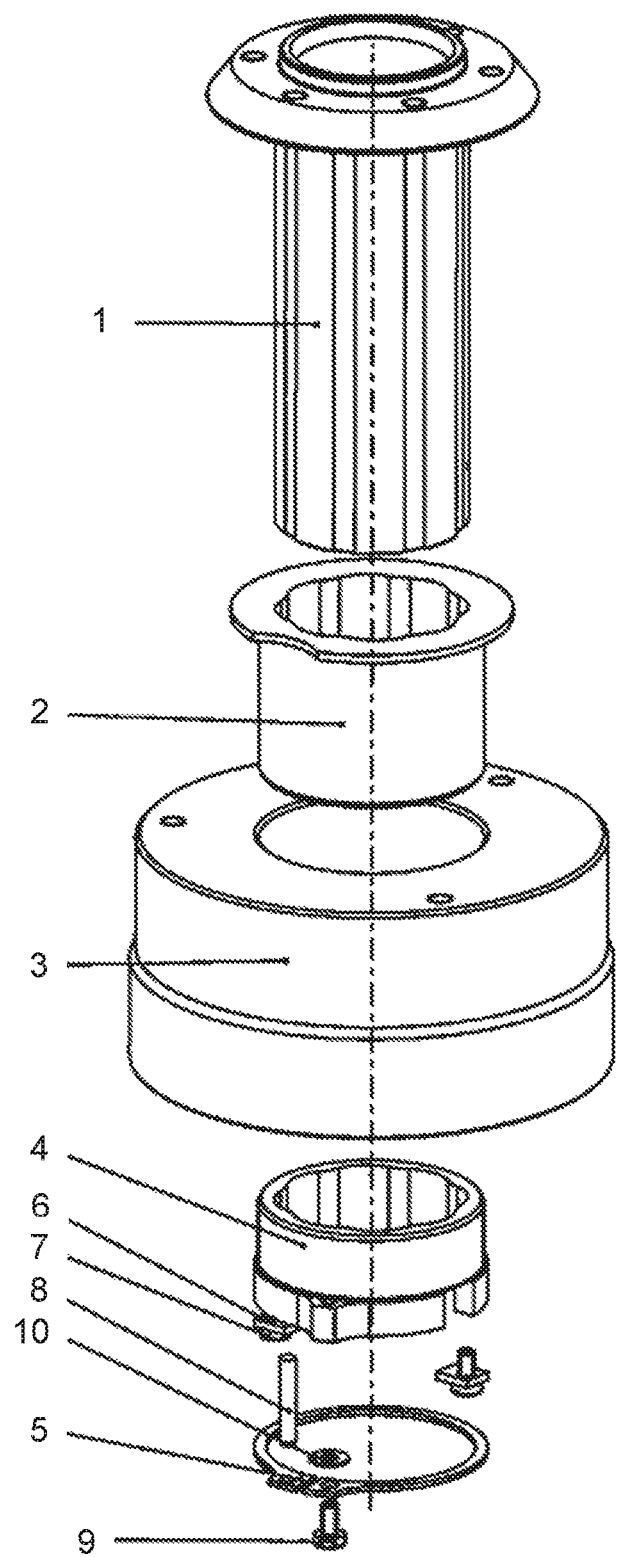
FIG. 1 shows an exploded view of an inventive sliding bearing according to a first exemplary embodiment.
Figure 2:
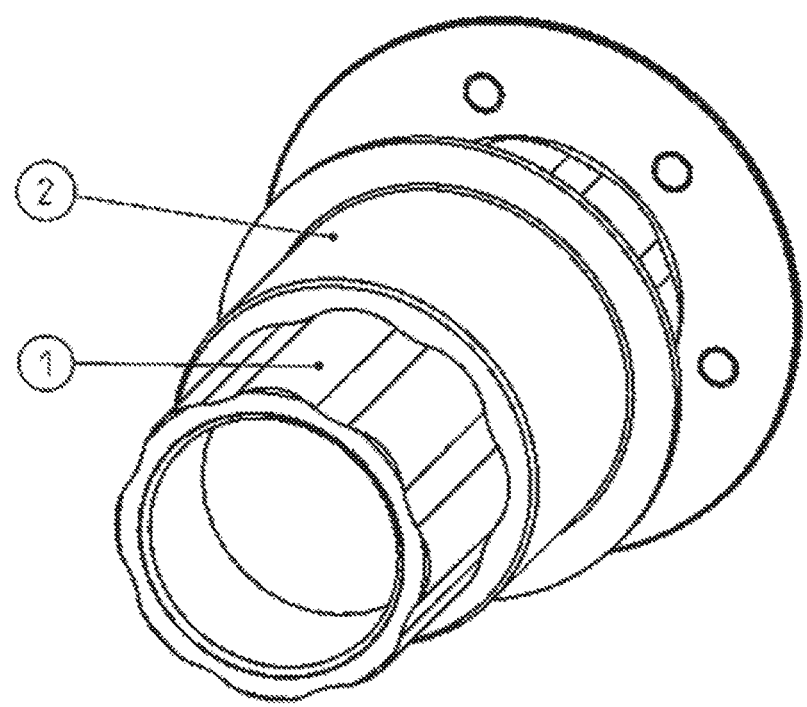
FIG. 2 shows a first partial perspective view of the first exemplary embodiment.
Figure 3:
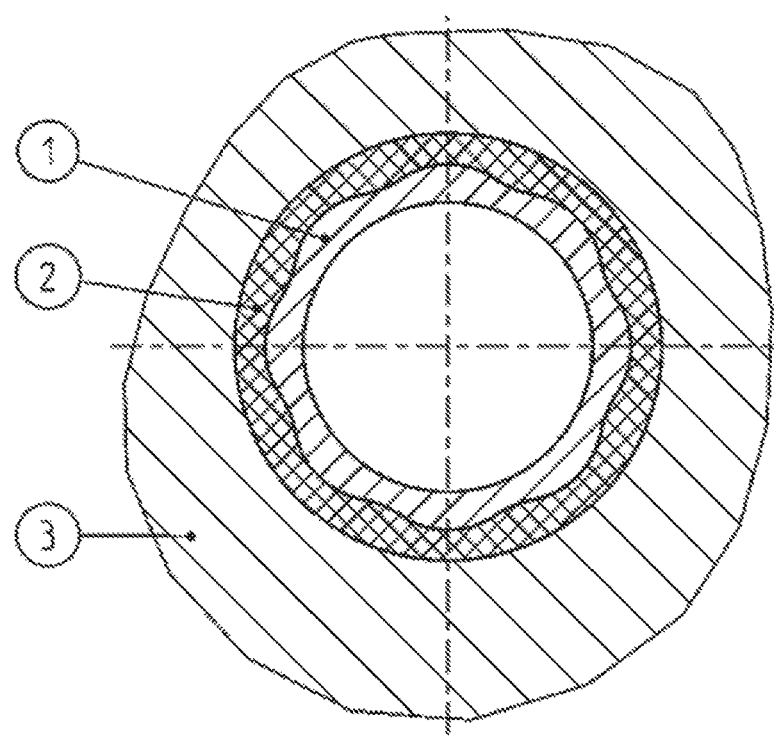
FIG. 3 shows a first sectional view of the first exemplary embodiment.

In an embodiment, the present invention provides a sliding linear bearing which reliably prevents rotation of the slider about the guide shaft in both directions of rotation, yet permits easy, play-free sliding of the slider.

According to an embodiment, a sliding linear bearing includes a guide shaft on which a slider is movably guided in a guide direction, and includes bushes inserted between the guide shaft and the slider. One of these bushes serves as a main bush and is fixedly attached to the slider, and the other one serves as a preloading bush and is held so as to be rotatable relative to the slider about the guide direction while being preloaded with a torque. A contact region between each of the bushes, on the one hand, and the guide shaft, on the other hand, blocks rotation about the guide direction between the slider and the guide shaft in both directions of rotation, the main bush and the preloading bush being preloaded by the torque in opposite directions of rotation without play relative to the guide shaft.

The preloading of the two bushes of the sliding bearing in opposite directions reliably prevents rotation of the slider about the guide shaft in both directions of rotation. Even if the contact regions are wearing over an extended period of time, the spring maintains the play-free preload, so that even after some time, it is possible to position a wafer without changing its orientation in terms of rotation about the guide direction.

The main bush is fixedly attached to the slider and primarily performs the function of centering the slider and the guide shaft. Moreover, it prevents relative tilting between the slider and the guide shaft. In contrast, the preloading bush can move freely in the slider within certain limits. The preloading bush is connected to the slider by a spring in the form of a torsion spring which provides the torque for play-free preloading.

The design of a sliding linear bearing according to the present invention is readily apparent from FIGS. 1-7, when viewed together. In the following, FIGS. 1-7 will be described in conjunction with each other.

A slider 3 is held on a guide shaft 1 such that it is movable in the guide direction. Two bushes 2, 4 are disposed between slider 3 and guide shaft 1. Main bush 2 is fixedly attached to slider 3, for example by adhesive bonding. In contrast, preloading bush 4 is disposed with some radial play within slider 3. Accordingly, the outer radius of the preloading bush 4 is somewhat smaller than the inner radius of the opening in slider 3.

Guide shaft 1 is made from anodized aluminum. The thickness of the oxide layer is approximately 35-40 μm. A suitable material for bushes 2, 4 is a plastic composite which has been specifically developed for sliding bearings and which, in addition to the base polymer, contains embedded fibers or fillers for reinforcement, as well as lubricants to reduce friction.

In order to retain preloading bush 4 in the slider, blocking devices 6 project into lateral recesses in preloading bush 4. Blocking devices 6 are attached to slider 3 by screws 7. Blocking devices 6 prevent preloading bush 4 from slipping out axially, but permit a certain rotation thereof within slider 3 since the recesses have a greater width than blocking devices 6 in the circumferential direction.

The inner surfaces of bushes 2, 4 and the outer surface of guide shaft 1 form contact regions where slider 3 slides along guide shaft 1. In order to prevent rotation of slider 3 relative to guide shaft 1, these components have meshing maxima and minima which are symmetrical within themselves and block rotation about the guide direction. Since such contact regions always have some play due to manufacturing tolerances and wear, main bush 2 and preloading bush 4 are preloaded by a torque in opposite directions of rotation relative to guide shaft 1. This eliminates the play between bushes 2, 4 and guide shaft 1; during displacement of slider 3, its angular position relative to guide shaft 1 is maintained.

The contact regions are undulated. Eight ridges and eight troughs around a respective circumference were discovered to be a good compromise between ease of manufacture and effective elimination of play.

The torque required for preloading is provided by a spring 5 in the form of a torsion spring. One end of this torsion spring 5 is attached to preloading bush 4 by an axial screw 9 and a washer 10; the other end of torsion spring 5 is connected to slider 3 by an axial pin 8. In the assembled condition, this torsion spring 5 is loaded, resulting in a torque acting between slider 3 and preloading bush 4.

Since slider 3 is fixedly attached to main bush 2, the torque ultimately acts between main bush 2 and preloading bush 4. Therefore, the torque is received by the meshing maxima and minima of the contact surfaces. Thus, the maxima and minima are urged against one another in the tangential direction, but with opposite senses of rotation in main bush 2 and preloading bush 4. Consequently, the sliding linear bearing is preloaded in both directions of rotation. Therefore, blocking devices 6 and the lateral recesses in preloading bush 4 that receive these blocking devices 6 must be dimensioned to allow sufficient play in order to enable play-free preloading between bushes 2, 4 and guide shaft 1, even after a certain wear of the contact regions.

Also, spring 5 must have sufficient temper and preload to prevent unwanted play even after a certain wear of the contact regions.

While slider 3 may slightly rotate relative to guide shaft 1 over an extended period of time due to wearing of the contact regions, this effect may be completely neglected during a single motion cycle because the angular position is stable during such cycle. A pre-adjusted workpiece, such as, for example, a wafer, will maintain its orientation.

Figure 4:
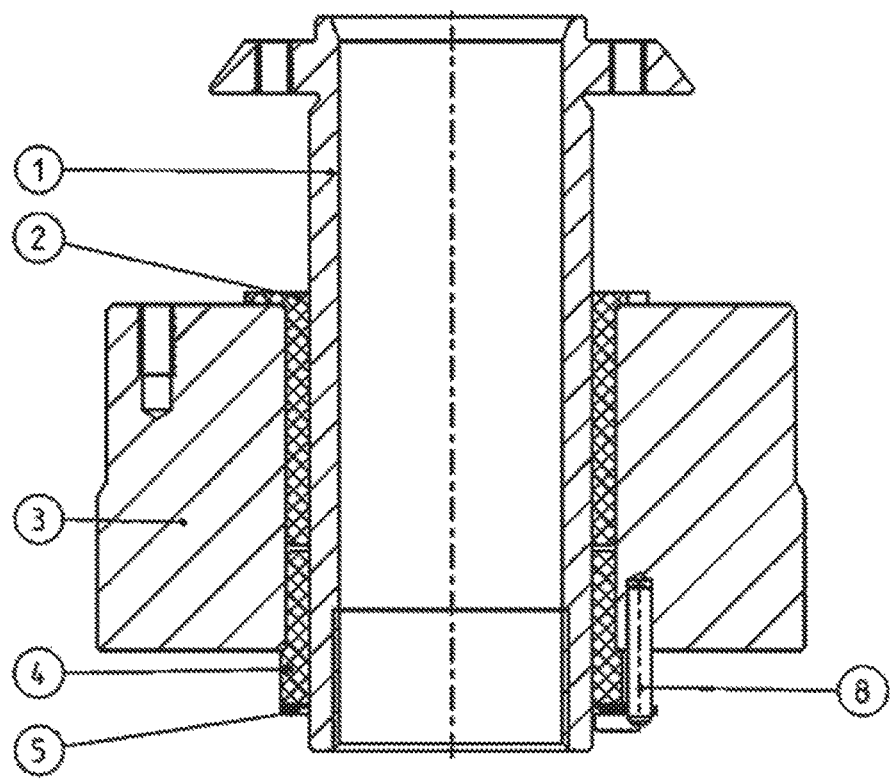
FIG. 4 shows a second sectional view of the first exemplary embodiment.
Figure 5:
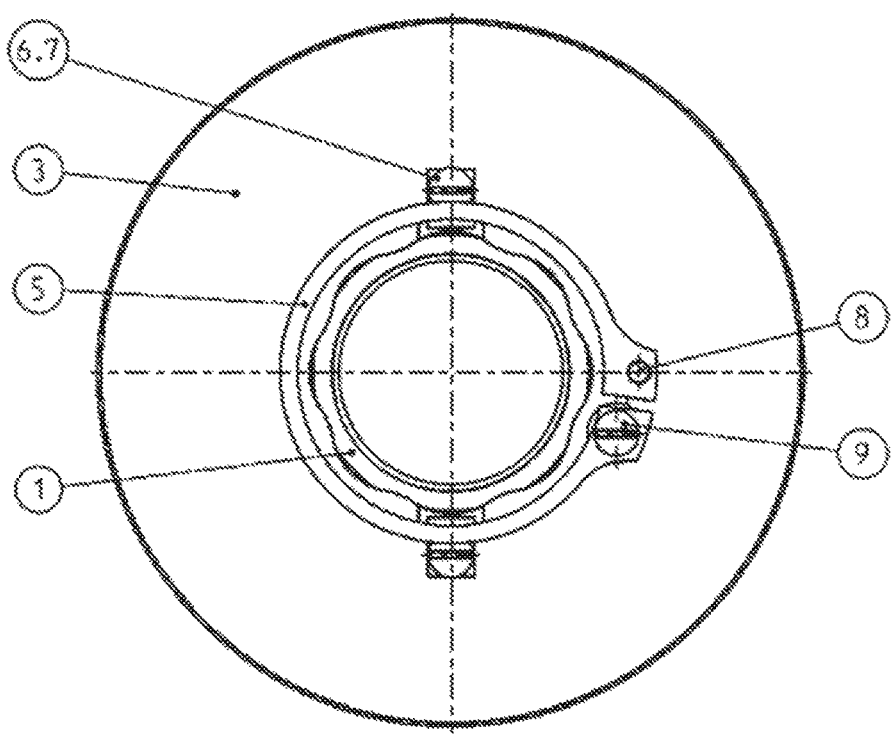
FIG. 5 shows a top view of the first exemplary embodiment.
Figure 6:
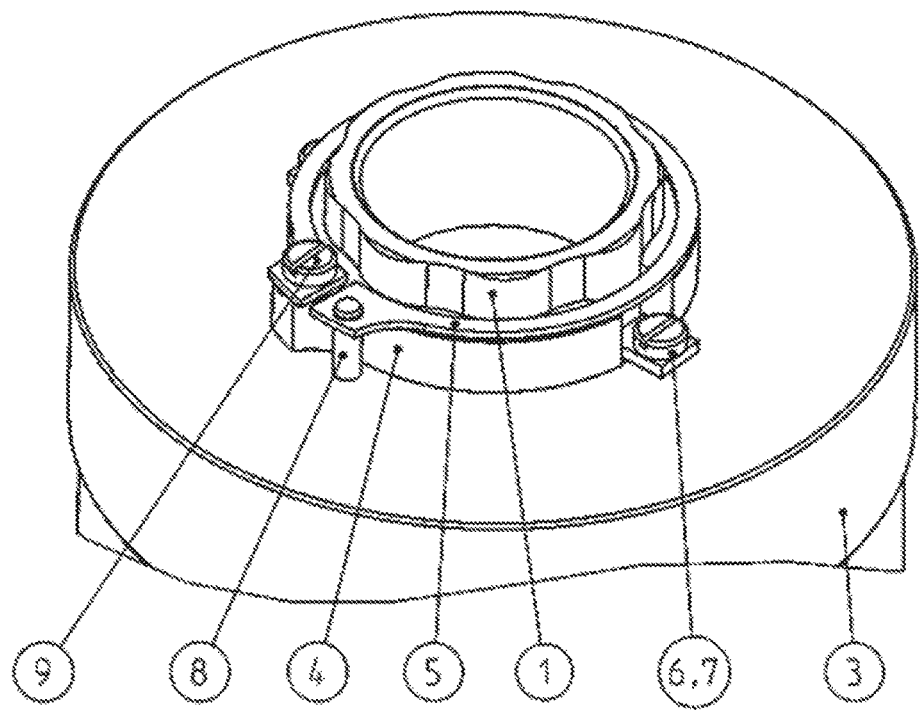
FIG. 6 shows a second partial perspective view of the first exemplary embodiment.
Figure 7:
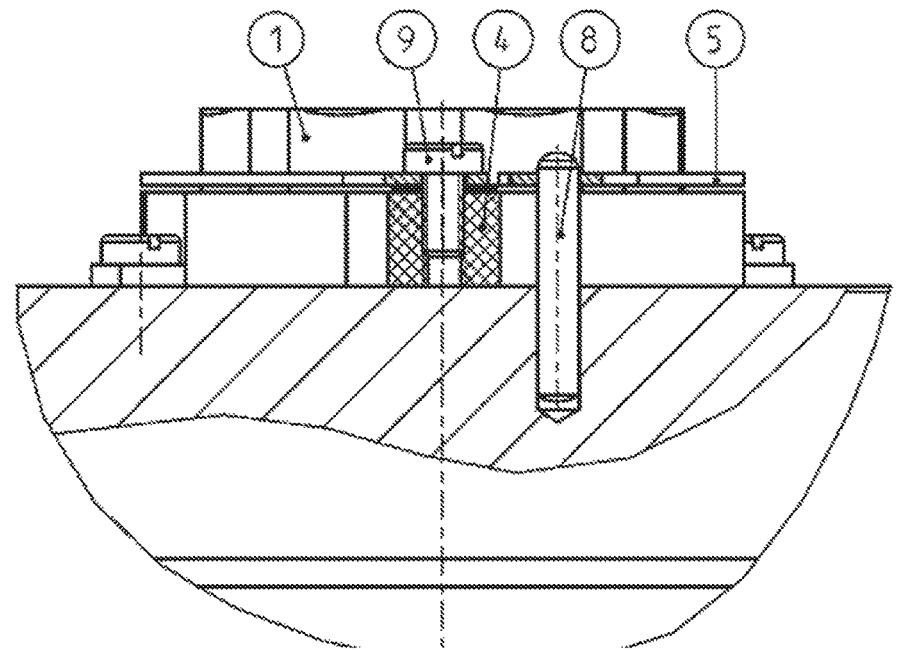
FIG. 7 shows a third sectional view of the first exemplary embodiment.

As can be readily seen especially in FIG. 4, main bush 2 is significantly longer than preloading bush 4 in the guide direction. This is owing to the fact that, as described above, main bush 2 mainly performs the function of guide slider 3, while preloading bush 4 primarily serves to produce the required torque.

Figure 8:
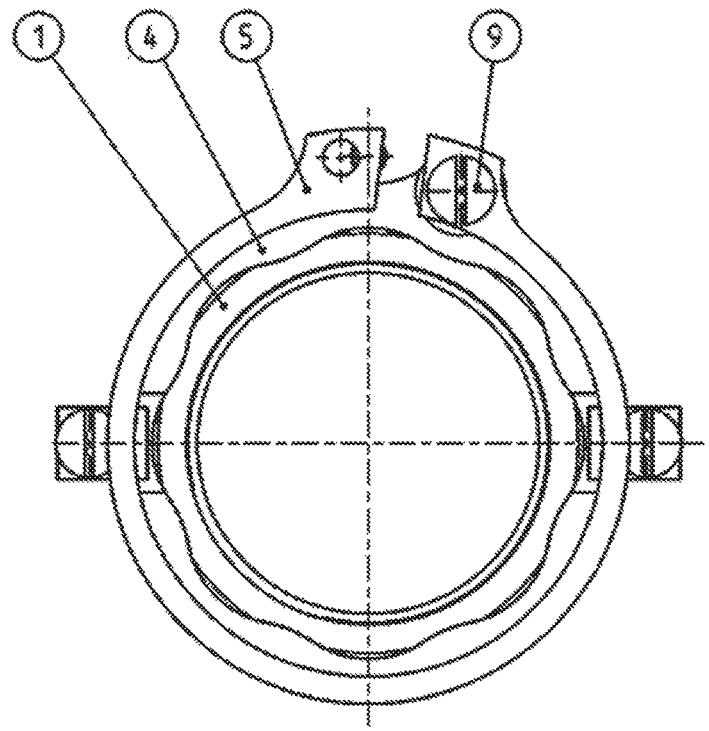
FIG. 8 illustrates a first step of the assembly of the sliding bearing.
Figure 9:
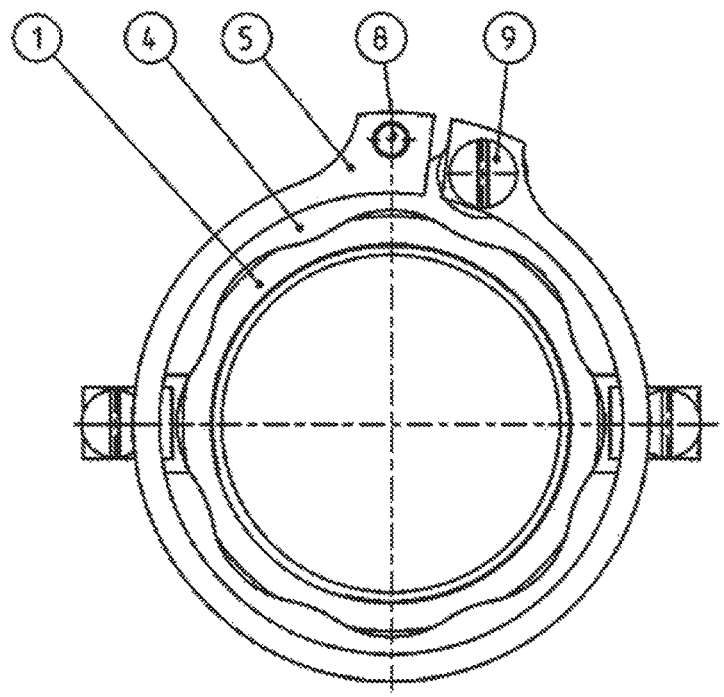
FIG. 9 illustrates a second step of the assembly of the sliding bearing.

FIGS. 8 and 9 show a mounting step of torsion spring 5. While in FIG. 8, torsion spring 5 is only attached by screw 9 to preloading bush 4 and is still relaxed, FIG. 9 shows torsion spring 5 after it has been loaded by compressing it and secured in the tangential direction by means of pin 8. Screw 9 and pin 8 may, of course, also be disposed at the respective other end of spring 5.

Moreover, guide shaft 1 is configured as a hollow shaft. This makes it possible to route supply lines through guide shaft 1. For example, it may be necessary to run a vacuum line to the upper end of guide shaft 1 to hold a wafer there by negative pressure, or to operate the actuators and sensors of an additional fine positioning system.

Figure 10:
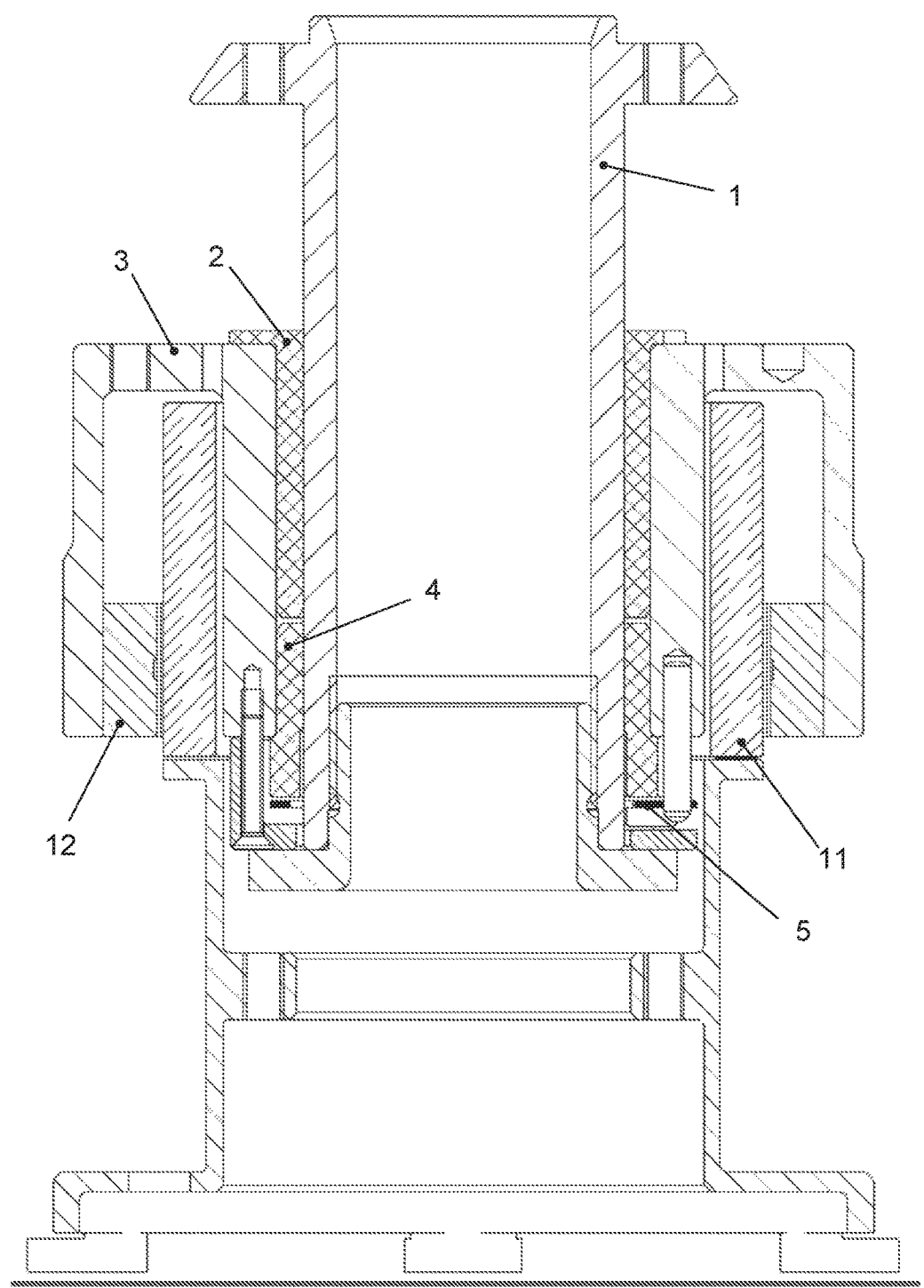
FIG. 10 shows a sliding bearing having an integrated electric motor according to a second exemplary embodiment.

FIG. 10 finally shows another exemplary embodiment of a sliding linear bearing. This sliding linear bearing is substantially similar in construction to the first exemplary embodiment, but has an additional electric motor allowing slider 3 to be moved along guide shaft 1. To this end, slider 3 has an annular circumferential U-section member having radially magnetized magnets 12 mounted therewithin. These magnets interact with a stationary, annularly disposed cylindrical coil 11 extending into the U-section member. Magnets 12 and coil 11 form a single-phase electric motor.

Thus, slider 3 can be moved by suitably energizing coil 11. The locations of magnets 12 and coils 11 can, of course, be reversed; however, this would have the disadvantage of requiring movable lead wires to coil 11.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A sliding linear bearing, comprising:
   a guide shaft on which a slider is movably guided in a guide direction, and
   bushes inserted between the guide shaft and the slider including a main bush that is fixedly attached to the slider and a preloading bush that is held so as to be rotatable relative to the slider about the guide direction, the main bush and the preloading bush being preloaded by a spring torque in opposite directions of rotation without play relative to the guide shaft,
   wherein a contact region between each of the bushes and the guide shaft blocks rotation about the guide direction between the slider and the guide shaft in both directions of rotation, wherein the preloading bush has lateral recesses into which project blocking devices fixedly attached to the slider, and wherein the recesses are dimensioned so that the preloading bush and the slider are rotatable relative to each other to achieve play-free preloading of the bushes relative to the guide shaft.

2. The sliding linear bearing as recited in claim 1, wherein the contact regions between the bushes and the guide shaft have meshing maxima and minima which are symmetrical within themselves.

3. The sliding linear bearing as recited in claim 2, wherein eight maxima and eight minima are arranged around a circumference of the contact regions.

4. The sliding linear bearing as recited in claim 1, wherein the contact regions are undulated.

5. The sliding linear bearing as recited in claim 1, wherein the torque is produced by a spring disposed between the preloading bush and the slider.

6. The sliding linear bearing as recited in claim 5, wherein the spring is a torsion spring whose ends are connected to the preloading bush and the slider, respectively.

7. The sliding linear bearing as recited in claim 6, wherein the spring is attached at one end by a screw and at the other end by a pin which, when the spring is loaded, extends through an opening in the spring into a bore in the slider or in the preloading bush.

8. The sliding linear bearing as recited in claim 1, wherein the outer diameter of the preloading bush is smaller than the inner diameter of the slider such that the preloading bush is freely rotatable in the slider to an extent permitted by the blocking devices.

9. The sliding linear bearing as recited in claim 1, wherein the blocking devices are disposed so as to prevent the preloading bush from slipping out of the slider in the guide direction.

10. The sliding linear bearing as recited in claim 1, wherein the guide shaft is configured as a hollow shaft.

11. The sliding linear bearing as recited in claim 1, wherein the slider carries magnets or coils forming part of an electric motor by which the slider is moveable along the guide shaft.

12. The sliding linear bearing as recited in claim 11, wherein the slider has an annular circumferential U-section member, the magnets of the electric motor being mounted within the U-section member, and a stationary, annular cylindrical coil of the electric motor extending into the U-section member.

13. The sliding linear bearing as recited in claim 12, wherein the magnets and the cylindrical coil form a single-phase electric motor.

14. A sliding linear bearing, comprising:
   a guide shaft on which a slider is movably guided in a guide direction, and bushes inserted between the guide shaft and the slider including a main bush that is fixedly attached to the slider and a preloading bush that is held so as to be rotatable relative to the slider about the guide direction, the main bush and the preloading bush being preloaded by a spring torque in opposite directions of rotation without play relative to the guide shaft,
   wherein a contact region between each of the bushes and the guide shaft blocks rotation about the guide direction between the slider and the guide shaft in both directions of rotation, wherein the torque is produced by a torsion spring whose ends are connected to the preloading bush and the slider, respectively, and wherein the spring is attached at one end by a screw and at the other end by a pin which, when the spring is loaded, extends through an opening in the spring into a bore in the slider or in the preloading bush.

* * * * *